3,084,168
2,4,6-TRIS(2-CYANOALKYL)-TRIOXANES

George W. Hearne, Lafayette, and George A. Kurhajec, Orinda, Calif., assignors to Shell Oil Company, New York, N.Y., a corporation of Delaware
No Drawing. Filed Dec. 29, 1960, Ser. No. 79,120
4 Claims. (Cl. 260—340)

This invention relates to novel trioxanes and to a process for their preparation. More particularly, it relates to novel 2,4,6-tris(substituted)-trioxanes and to a novel process for their preparation.

The novel trioxanes of the present invention find important utility in the field of chemical intermediates. More specifically, they are useful as chemical intermediates in the preparation of the alpha-amino acids, that is, those amino acids containing an amino ($NH_2$) or substituted amino group on a carbon atom alpha to the carboxyl (—COOH) group. They are especially useful in the preparation of the biologically important alpha-amino derivatives of the dicarboxylic acids. Certain of these amino acids are alpha-amino acids of the general formula HOOCRCH($NH_2$)COOH, wherein R represents an alkyl group. The biologically important alpha-amino acids determine, in large measure, the physiological activity of plants and animals. Certain alpha-amino acids are considered essential to growth and life itself. Moreover, certain alpha-amino acids and mixtures of amino acids prepared by the hydrolysis of proteins have been found effective when taken by mouth or given intravenously for the alleviation of hypoprotonemia, liver damage, gastrointestinal ulcers, muscular weakness and other biological conditions. Recognition of the clinical as well as the nutritional value of amino acids has led to increased interest in the manufacture of alpha-amino acids and mixtures of amino acids for therapeutic purposes.

Of primary importance has been the alpha-amino dicarboxylic acid, glutamic acid. Glutamic acid has long been used in the field of medicine to combat various metabolic and mental disorders. Moreover, it finds widespread use in the food industry in the form of the monosodium salt, monosodium glutamate, to enhance the flavor of various food products. Glutamic acid, for these and other uses, has heretofore primarily been obtained from natural sources such as, for example, by the acid hydrolysis of wheat gluten and sugar beet waste. The process employed for obtaining the acid from such sources is complex and costly and results in comparatively expensive glutamic acid. Routes for synthesizing this acid from starting materials and intermediates obtained therefrom have been proposed, but such methods are disadvantageous because of relatively high cost of the starting materials and concomitant high cost of the intermediates obtained therefrom. The starting materials of the present invention and the novel intermediates obtained present a relatively inexpensive synthetic route to the synthesis of glutamic acid, as well as to the synthesis of other important alpha-amino acids.

An object of the present invention is to provide novel trioxanes and a process for their preparation. Another object is the provision of novel 2,4,6-tris(substituted)-trioxanes and a process for their preparation. A further object is the provision of novel 2,4,6-tris(2-cyanoalkyl)-trioxanes and 2,4,6-tris(2-haloalkyl)-trioxanes, useful as intermediates in the synthesis of alpha-amino acids, especially glutamic acid. A still further object is the provision of novel 2,4,6-tris(2-cyanoethyl)-trioxane and 2,4,6-tris(2-chloroethyl)-trioxane useful as intermediates in the synthesis of glutamic acid. A further specific object is to provide novel trimers of beta-cyanopropionaldehyde and beta-chloropropionaldehyde. Other objects will become apparent to those skilled in the art to which this invention pertains from the ensuing description thereof.

This invention partially resides in the discovery of new 2,4,6-tris(substituted)-trioxanes. These novel trioxanes may be considered as derivatives of trioxane which has the following structure:

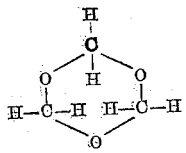

in which only one hydrogen atom on each ring carbon atom has been replaced by a carbon atom of an alkyl group bearing a halogen atom or a cyano radical on the beta carbon atom thereof, that is, the carbon atom adjacent to the carbon atom linking the alkyl group to the carbon atom of the trioxane ring. Or they may be thought of as trimers, that is, trimeric condensation products of three molecules of a beta-cyanoalkyl aldehyde or beta-haloalkyl aldehyde, thereby resulting in the trimer nitrile or trimer halide, respectively.

In addition to the novel trioxanes per se, this invention further resides in the preparation of these novel 2,4,6-tris(substituted)-trioxanes by reacting an alpha,beta-unsaturated aliphatic aldehyde, e.g., an alpha,beta-olefinically unsaturated aliphatic aldehyde, with a hydrogen halide, thereby obtaining the corresponding beta-haloalkyl aldehyde which in turn is trimerized to the beta-haloalkyl trioxane. This trioxane is then treated with cyanide ion to yield the corresponding beta-cyanoalkyl trioxane.

The foregoing objects of this invention are accomplished by providing, as new compositions of matter, novel 2,4,6-tris(substituted)-trioxanes having the general formula:

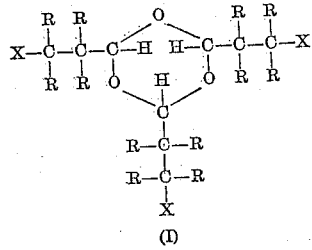

in which R represents a hydrogen atom or an alkyl radical containing from 1 to 12 carbon atoms which may be either straight or branched chain, and X represents a halogen atom or a cyano radical.

A preferred embodiment of this invention relates to 2,4,6-tris(substituted)-trioxanes having the general formula, as above defined, in which R represents a hydrogen atom or a straight-chain alkyl radical containing from 1 to 6 carbon atoms, and X represents a chlorine atom or a cyano radical.

An especially preferred embodiment relates to 2,4,6-tris(substituted)-trioxanes having the general formula, as above defined, in which R represents a hydrogen atom and X represents a chlorine atom or a cyano radical.

Most conveniently, the trioxanes of the invention may be prepared by reacting (1) an alpha,beta-olefinically unsaturated aliphatic aldehyde with a hydrogen halide, thereby obtaining the corresponding beta-haloalkyl aldehyde; (2) allowing the beta-haloalkyl aldehyde to trimerize to the corresponding beta-haloalkyl trioxane; (3) and treating the resulting trioxane with cyanide ion, thereby obtaining the corresponding beta-cyanoalkyl trioxane.

The alpha,beta-olefinically unsaturated aliphatic aldehyde vapor and anhydrous hydrogen halide are mixed in a jet at the top of a vertical tube cooled with tap water.

The reaction may take place either in the vapor phase or in a liquid film on the wall of the reactor. A slight excess, up to about 10% excess, of the hydrogen halide over the aldehyde is preferred in order to facilitate condensation of the beta-haloalkyl aldehyde into the corresponding aldehyde trimer. The temperature range of the reaction between the aldehyde and the hydrogen halide primarily depends upon the boiling point of the particular starting aldehyde. A temperature range of from about 50° to about 150° C. may be employed. A temperature range of from about 50° to about 110° C. is preferred, with a most preferred temperature range of from about 50° to about 60° C. The trimerization of the beta-haloalkyl aldehyde may partially occur spontaneously at the above reaction temperatures and at room temperature (20° to 25° C.) to a certain degree, but is most preferably trimerized in a cold environment within the range of from about −50° C. to about +10° C.

The haloalkyl trioxane is treated with cyanide ion in the presence of an appropriate solvent to obtain the corresponding cyanoalkyl trioxane. The particular solvent medium for the cyanide ion may be any one of a number of solvents such as, for example, alcohols, alicyclic dioxides, Cellosolves, and the like. The liquid phase reaction between the cyanide ion and the haloalkyl trioxane is carried out at the refluxing temperature of the particular solvent employed which may range from about 50° to about 200° C., with a most preferred temperature range of from about 100° to about 150° C., and an especially preferred temperature range of from about 110° to about 128° C.

The cyanide ion reacts with the alpha,beta-olefinically unsaturated aliphatic aldehyde e.g., acrolein, at the carbonyl group. In many compounds in which a carbonyl group is present in the molecule, it is difficult to effect reaction with cyanides at any place other than at the carbonyl group. In the trimeric form of the beta-haloalkyl aldehyde, e.g., beta-chloropropionaldehyde, the carbonyl group is converted to the trioxane ring (cyclic acetal) and thus allows replacement of the halogen atom by the cyano group. In a preliminary experiment in which acrolein, hydrogen chloride and cyanide ion were employed, about 80% of the beta-chloropropionaldehyde trimer was converted into the beta-cyanopropionaldehyde trimer.

For illustrative purposes, the preparation of 2,4,6-tris-(2-chloroethyl)-trioxane (II) and 2,4,6 - tris(2 - cyanoethyl)-trioxane (III) may be shown by the following reaction scheme:

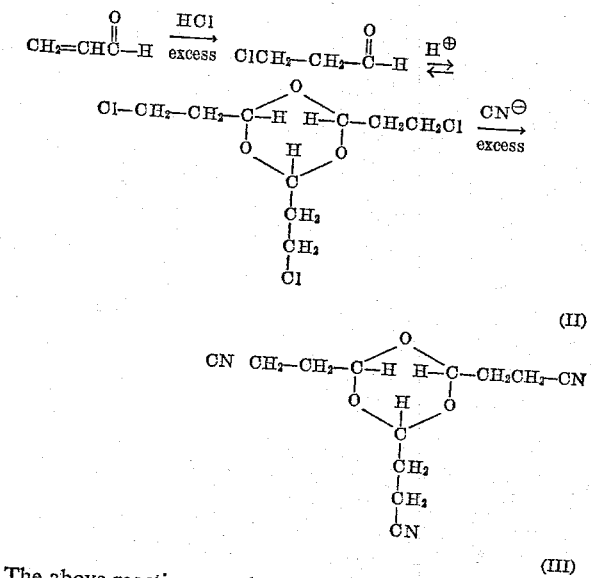

The above reaction may be looked upon as a vapor phase reaction between acrolein and excess hydrogen chloride to give the monomeric beta-chloropropionaldehyde which in turn trimerizes at about 10° C. The beta-chloropropion-aldehyde trimer is then reacted with a 2:1 excess of sodium cyanide over the trimer chloride in methyl Cellosolve for about 16 hours to give the corresponding trimer nitrile.

In conducting the process of the invention, the relative proportions of the reactants can be varied. It is preferred to employ a slight excess of the hydrogen halide over the alpha,beta-olefinically unsaturated aliphatic aldehyde in order to aid in promoting trimerization of the aldehyde. Also, it may be advantageous to employ an excess of cyanide ion over the haloalkyl trioxane to insure a complete reaction and total substitution of the cyano radical for the halogen atom on the alkyl carbon atom beta to each carbon atom attached to a trioxane ring carbon atom.

Representative alpha,beta-olefinically unsaturated aliphatic aldehydes which may be employed in the practice of this invention include, for example, acrolein, methacrolein, crotonaldehyde, beta-methyl crotonaldehyde; 2-methyl-2-butenal; 2-hexenal; alpha-isopropyl acrolein; 2-heptenal; 2-ethyl-2-hexenal; 2-nonenal; 2-undecenal; and the like. Representative hydrogen halides which may be employed are hydrogen chloride, hydrogen bromide, hydrogen iodide and hydrogen fluoride. Representative solvents which may be employed include the alcohols such as, for example, the lower alkanols containing from 1–12 carbon atoms such as, for example, methanol, ethanol, propanol, isopropanol, butanol, heptanol, octanol, decanol, and the like; the alicylic dioxides such as, for example, dioxane and the like; and the Cellosolves such as, for example, Cellosolve, methyl Cellosolve, ethyl Cellosolve, butyl Cellosolve, Cellosolve acetate, and the like. The cyanide ion may exist in the form of an alkali metal cyanide such as, for example, sodium cyanide, potassium cyanide and lithium cyanide; an alkaline earth metal cyanide such as, for example, calcium cyanide, magnesium cyanide and barium cyanide; or a noble metal cyanide such as, for example, silver cyanide, copper cyanide, and the like.

We have discovered that the trioxane ring of the 2,4,6-tris(2-cyanoethyl)-trioxane (trimer nitrile) can be selectively hydrolyzed to monomeric beta-cyanopropionaldehyde by refluxing an aqueous solution of the trimer nitrile with a small amount of an aqueous catalyst such as sulfuric acid or Dowex 50X8 resin. For example, the trimer was hydrolyzed in the presence of Dowex 50X8 resin and then filtered. This yielded an aqueous solution of beta-cyanopropionaldehyde. To this solution was added ammonium carbonate and hydrogen cyanide. The solution was slowly heated to about 65° C. at which point the excess ammonium carbonate decomposes. This aqueous solution of the hydantoin of beta-cyanopropionaldehyde was then heated to 180° C. in an autoclave with barium hydroxide. After hydrolysis of the hydantoin, ammonium carbonate was added to precipitate barium carbonate. The filtrate was then concentrated to about one-tenth its volume. In this step the excess ammonium carbonate was again destroyed. Acidification to a pH of about 3.2 and evaporation produced glutamic acid in a yield of about 65% based on the trimer nitrile and 55% based on acrolein.

In a similar experiment the trimer nitrile was hydrolyzed in the presence of sulfuric acid and the hydantoin was prepared from the aqueous aldehyde solution. The hyantoin was isolated and found to be tha tof the beta-amide (80% yield). Glutamic acid was produced by the hydrolysis of the above hydantoin with barium hydroxide in a yield of about 55%.

The trioxanes of this invention and their preparation are illustrated by the following specific examples. It is to be understood that the examples are merely illustrative and are not to be regarded as limiting since the basic teachings herein may be varied at will as will be understood by one skilled in the art to which this invention pertains.

Example I.—2,4,6-Tris(2-Chloroethyl)-Trioxane

To 285 ml. (4.1 moles) of acrolein was added 150 g. (4.1 moles) of anhydrous hydrogen chloride over a period of about 2⅙ hours. The acrolein vapor and anhydrous hydrogen chloride were mixed in a jet at the top of a vertical tube cooled with tap water. A flow rate of about two moles per hour was maintained by a rotometer. Approximately 1.2 g. of hydrogen chloride was added per minute. At the end of about 2⅙ hours, 150 g. of hydrogen chloride had reacted with 285 ml. of acrolein to form about 380 g. (4.1 moles) of a clear, water-white liquid product containing beta-chloropropionaldehyde.

The monomeric beta-chloropropionaldehyde obtained was allowed to trimerize at a temperature of about 0° C. The resultant trimer, 2,4,6-tris(2-chloroethyl)-trioxane, was obtained as a white solid at room temperature, M.P. 25–30° C.

Example II.—2,4,6-Tris(2-Cyanoethyl)-Trioxane

To 443 g. (9.04 moles) of sodium cyanide in one liter of methyl Cellosolve was added 367 g. (1.32 moles) of 2,4,6-tris-(2-chloroethyl)-trioxane. The reaction mixture was heated to gentle reflux (about 110° C.) for approximately 21 hours. The reaction mixture was then cooled to about 75° C. and filtered. The crude product (about 1890 g.) was washed with 200 ml. methyl Cellosolve. About one-half of the washed crude product was added to 2.5 liters of water and stirred for about one hour and then filtered to give 154 g. of crude trioxane. The second half of the washed crude product was treated in a similar manner to yield 200 g. of crude trioxane. The crude trioxanes were combined and washed with water. The trioxane obtained from this treatment was filtered out and dried to yield 256 g. (1.02 moles) or 77% of 2,4,6-tris(2-cyanoethyl)-trioxane, as white or very light yellow crystals, M.P. 126–127° C. (corrected value 127–128° C.).

Stripping of the above filtrate yielded an additional 46 g. of the trioxane and a combined yield of 91° (theory).

A procedure has been developed for obtaining excellent yields of 2,4,6-tris(2-cyanoethyl)-trioxane. The cyano trimer is prepared by heating to a reflux a 2:1 mixture of sodium cyanide and beta-chloropropionaldehyde trimer [2,4,6-tris(2-chloroethyl)-trioxane] with methyl Cellosolve as solvent. The cyano trimer [2,4,6-tris-(2-cyanoethyl)-trioxane] has a melting point of 127–128° C. (recryst. CH₃OH).

Analysis:

|  | C | H | N |
|---|---|---|---|
| Calculated for C₁₂H₁₅O₃N₃ (M.W. 249.30) | 57.6 | 6.0 | 16.8 |
| Found | 58.0 | 6.1 | 16.5 |

As indicated in this disclosure, the novel trioxanes of the invention have important utility in the field of chemical intermediates, especially as intermediates in the preparation of glutamic acid.

It is to be understood, however, that the invention is not to be limited to the exact details of operation or exact compounds shown and described, as obvious modifications and equivalents will be apparent to one skilled in the art and the invention is, therefore, limited only by the scope of the appended claims.

We claim as our invention:

1. The compound 2,4,6-tris(2-cyanoethyl)-trioxane.
2. The process for the preparation of 2,4,6-tris(2-cyanoethyl)-trioxane, which comprises reacting acrolein with hydrogen chloride, thereby obtaining beta-chloropropionaldehyde monomer; trimerizing said monomer at a temperature of from −50° C. to +150° C., thereby obtaining 2,4,6-tris(2-chloroethyl)-trioxane; and reacting said trioxane with cyanide ion, thereby obtaining 2,4,6-tris(2-cyanoethyl)-trioxane.
3. The 2,4,6-tris(2-cyanoalkyl)-trioxane of the formula

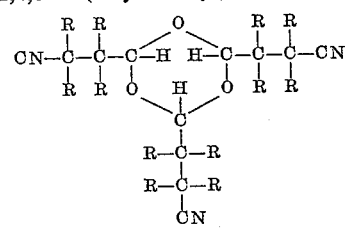

wherein R is selected from the group consisting of hydrogen and straight-chain alkyl of 1 to 6 carbon atoms, at least one R on the number 1-carbon atom of each 2-cyanoalkyl moiety being hydrogen.

4. The process for the preparation of the 2,4,6-tris(2-cyanoalkyl)-trioxane of the formula

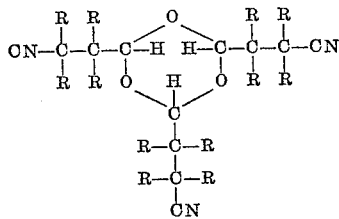

wherein R is selected from the group consisting of hydrogen and straight-chain alkyl of 1 to 6 carbon atoms, at least one R on the number 1-carbon atom of each 2-cyanoalkyl moiety being hydrogen, which comprises reacting the alpha-beta olefinically unsaturated aliphatic aldehyde of the formula C(R₂)=C(R)CHO with hydrogen halide, thereby obtaining the corresponding beta-haloalkyl aldehyde monomer; trimerizing said monomer at a temperature of from −50° C. to +150° C., thereby obtaining the corresponding 2,4,6-tris(2-haloalkyl)-trioxane; and reacting said trioxane with cyanide ion, thereby obtaining the corresponding 2,4,6-tris-(2-cyanoalkyl)-trioxane.

References Cited in the file of this patent
UNITED STATES PATENTS

| 2,831,896 | Holly | Apr. 22, 1958 |
| 2,864,827 | Baer et al. | Dec. 16, 1958 |
| 2,989,511 | Schnizer | June 20, 1961 |

OTHER REFERENCES

Farberov et al.: "Zhur. Obschei Khim," volume 28, pages 2151–62 (1958).